United States Patent
Wieland

(10) Patent No.: US 7,976,101 B2
(45) Date of Patent: Jul. 12, 2011

(54) SEATING APPARATUS INCLUDING VEHICLE CONTAINER

(75) Inventor: Klaus Wieland, Bibersfeld (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 359 days.

(21) Appl. No.: 12/153,220

(22) Filed: May 15, 2008

(65) Prior Publication Data

US 2009/0001779 A1    Jan. 1, 2009

(30) Foreign Application Priority Data

Jun. 30, 2007    (DE) .................. 10 2007 030 565

(51) Int. Cl.
*B60N 3/00*    (2006.01)
(52) U.S. Cl. .......................... 297/188.13; 297/188.08
(58) Field of Classification Search ............ 297/188.12, 297/188.13; 277/122 R
See application file for complete search history.

(56) References Cited

U.S. PATENT DOCUMENTS

| | | | | |
|---|---|---|---|---|
| 2,931,550 | A | * | 4/1960 | Wood .......................... 224/275 |
| 3,623,683 | A | * | 11/1971 | Bennett .................... 297/188.11 |
| 6,082,816 | A | * | 7/2000 | Gottlieb et al. ........... 297/188.1 |
| 6,152,527 | A | | 11/2000 | McDowell |
| 6,960,110 | B2 | * | 11/2005 | Hough ............................ 441/80 |
| 7,077,466 | B2 | * | 7/2006 | Forstner et al. .......... 297/188.08 |
| 7,252,569 | B2 | * | 8/2007 | Everhart et al. .......... 297/188.03 |

FOREIGN PATENT DOCUMENTS

| | | |
|---|---|---|
| DE | 199 44 619 A1 | 4/2001 |
| DE | 101 43 438 A1 | 3/2003 |
| EP | 01 47 376 A1 | 7/1985 |
| EP | 15 16 826 A1 | 3/2005 |
| EP | 16 47 483 A1 | 4/2006 |

OTHER PUBLICATIONS

German Search Report for corresponding patent application No. DE 10 2007 030 565.8.

* cited by examiner

*Primary Examiner* — Peter R. Brown
(74) *Attorney, Agent, or Firm* — Posz Law Group, PLC

(57) ABSTRACT

An airplane seating apparatus includes a lifejacket container arranged, at least in open and closed states, exclusively on a side of a front boundary area that faces the seating apparatus. The front boundary area is formed by an area which runs through a seat front side perpendicularly to a seat mounting surface.

6 Claims, 4 Drawing Sheets

SEATING APPARATUS INCLUDING VEHICLE CONTAINER

CROSS REFERENCE TO RELATED APPLICATION

The present application is related to, claims priority from and incorporates by reference German Patent Application No. DE 10 2007 030 565.8-01 filed on Jun. 30, 2007.

TECHNICAL FIELD

The invention relates to a seating apparatus and in particular to an airplane seating apparatus with a lifejacket container.

BACKGROUND

Airplane seating apparatuses with a lifejacket container are already known. However, there is a need in the art for a seating apparatus with a lifejacket container that may advantageously be arranged even on an airplane emergency escape route.

SUMMARY

Accordingly, a seating apparatus is provided that includes a lifejacket container that may advantageously be arranged even on an emergency escape route.

According to one exemplary embodiment, the lifejacket container is arranged both in open and closed states exclusively on a side of a front boundary defined by a plane that runs perpendicularly to a seat mounting surface and adjacent an edge of a seat front side. A seating apparatus with a container of this type can advantageously be arranged on an emergency escape route without parts of the lifejacket container protruding into the escape route.

The seating apparatus includes a seat that is provided for the purpose of absorbing the weight of a person seated in the seating apparatus. Furthermore, the seating apparatus includes a backrest. The term "seat front side" is to be understood as meaning a side located opposite the backrest. The term "seating direction" is to be understood as meaning a direction that is generally perpendicular to the backrest and that is oriented from the backrest in the direction of the seat front side. In addition, the seating apparatus includes at least three fastening points that are provided for the purpose of arranging the seating apparatus on a floor and that together define a plane that will be referred to herein as a "seat mounting surface."

Furthermore, the lifejacket container is arranged below the seat surface of the seating apparatus and is configured so that a lifejacket can be removed from the lifejacket container in a simple manner, particularly if the lifejacket container is arranged such that the lifejacket can be removed in the seating direction. The term "down" is to be understood as meaning a direction that is oriented perpendicularly to the seat mounting surface from the seat surface in the direction of the seat mounting surface, and the phrase "below the seat surface" is to be understood as meaning the space between the seat surface and the seat mounting surface.

Furthermore, according to another exemplary embodiment, a vehicle container, and in particular a lifejacket container, includes a storage unit and a lid with a lid fastening unit, wherein a height of the lid is less than an overall height of the vehicle container. As a result, a vehicle container having dimensions in an open state that are equal to or smaller than the dimensions in the closed state can be realized in a simple manner. A vehicle container of this type is advantageous in particular for an airplane seating apparatus that is to be arranged on an emergency escape route. The term "vehicle container" is to be understood in particular as meaning a container for a water craft, such as, for example, a ship, and/or, particularly advantageously, for an aircraft, such as, for example, an airplane, a helicopter and/or a zeppelin. The phrase "overall height of the vehicle container" is to be understood as meaning a maximum dimension of the vehicle container in an orientation in which it is to be placed, in particular in a basic position, and/or is to be fastened, in particular to a seating apparatus, in a vertical direction, with the term "vertical" being defined by a direction of a weight in the basic position. Furthermore, the phrase "height of the lid" is to be understood as meaning a dimension of the lid in the vertical direction.

In particular, it is advantageous if the height of the lid is less than 70% of the overall height of the lifejacket container, with a height of 40% to 60% or approximately 50% of the overall height of the lifejacket container being particularly advantageous. As a result, an advantageous position of the lid, in particular in the open state, can be achieved in a simple manner.

In accordance with another exemplary embodiment, the lid fastening unit includes a positive and/or non-positive fastening means, with a fleece and hook strip or a touch and close fastener being particularly advantageous. A fastening means configured in such a manner enables the lid to be advantageously arranged and fastened in the closed state.

Furthermore, according to another exemplary embodiment, the lid fastening unit includes at least one flexurally soft retaining means. A cost-effective fastening of the lid can be realized in a simple manner by means of a flexurally soft retaining means. The term "flexurally soft" retaining means is to be understood, in particular, as meaning a retaining means such as, for example, a chain, a strip or, particularly advantageously, a cable, which is unable to absorb any force in one direction, and particularly transversely with respect to its longitudinal extent.

It is particularly advantageous if the lid fastening unit includes, in particular, two flexurally soft retaining means that are arranged in an outer side region of the lid and/or in an outer side region of the storage unit. By means of two advantageously designed and arranged flexurally soft retaining means, a defined position of the lid, in particular in the open state, can be achieved. The term "side regions" is to be understood as meaning regions of the lid or of the storage unit that lie within a space defined by the outer 10% of a maximum dimension of the lid or of the storage unit in any desired direction and by areas perpendicular to the dimension. The term "outer" side regions is to be understood as meaning side regions in which the direction of the maximum dimension is perpendicular to the vertical direction and parallel to a main direction of extent of the lid.

There is preferably arranged on the vehicle container an opening unit that includes a cut-out and an opening means, with the opening means being guided out of the storage unit to the outside through the cut-out. By means of an advantageously configured opening unit, the vehicle container can be opened in a simple manner, with an opening means which is configured in a flexurally soft manner, such as, in particular, a strip, being particularly advantageous. However, other opening units appearing expedient to a person skilled in the art are also conceivable.

According to another exemplary embodiment, the storage unit is of multi-part design. Simple filling of the vehicle container is thereby made possible. In particular, a two-part embodiment can be produced in a simple manner.

Furthermore, according to another exemplary embodiment, the storage unit may include at least one connecting unit that is designed as a latching unit and is provided for the purpose of connecting parts of the storage unit to one another. By means of a connecting unit designed as a latching unit, the vehicle container can be opened in a simple manner without a tool and can be filled. Two latching units that are formed integrally with the storage unit and are arranged on opposite sides of the storage unit are particularly advantageous, as they are particularly cost-effective and simple to produce.

Furthermore, an opening method for a vehicle container is proposed, wherein the lid, as the container is opened, rotates through at least 170° and/or is downwardly offset. The effect which can be achieved in a simple manner by such an opening method, in particular by rotation of the lid through at least 170°, is that a seating apparatus with a container of this type can advantageously be arranged on an emergency escape route.

BRIEF DESCRIPTION OF THE DRAWINGS

Further advantages emerge from the description below of the drawings. The drawings illustrate exemplary embodiments and, together with the description and the claims, contain numerous features in combination. A person skilled in the art will also expediently consider the features individually and put them together to form meaningful further combinations.

DETAILED DESCRIPTION

Figure 1:
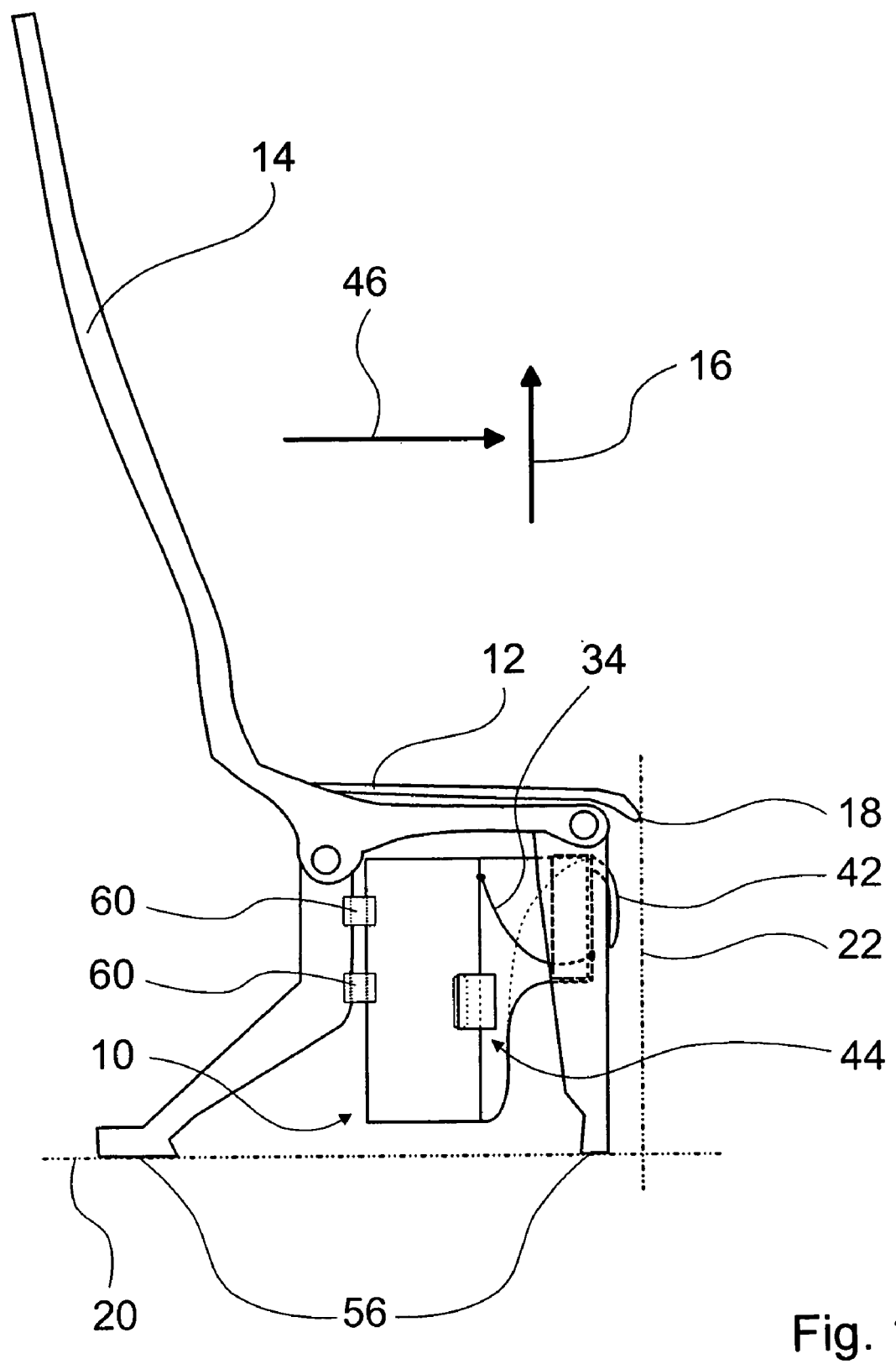
FIG. 1 shows a side view of an airplane seating apparatus with a lifejacket container in a closed state.

FIG. 1 shows a side view of an airplane seating apparatus with a container 10, such as a lifejacket container for a lifejacket (not illustrated specifically), in a closed state. The lifejacket container 10 is arranged below a seat surface 12. The seating apparatus includes the seat surface 12 and a backrest 14 that is arranged generally perpendicularly to the seat surface 12 on a side of the seat surface 12 that faces away from a seat mounting surface 20. A side lying opposite the seat surface 12 is a seat front side 18. A front boundary area 22 runs adjacent to an edge of the seat front side 18 and is perpendicular to the seat mounting surface 20. The seat mounting surface 20 is defined by four fastening points 56 of the seating apparatus, which fastening points define a plane. The fastening points 56 are provided to fasten the seating apparatus on a floor (not illustrated specifically).

The lifejacket container 10 (FIG. 2), which is produced from a plastic and is affixed to the seating apparatus by fasteners 60, includes a storage unit 24 and a lid 26 with a lid fastening unit 28.

Figure 4:
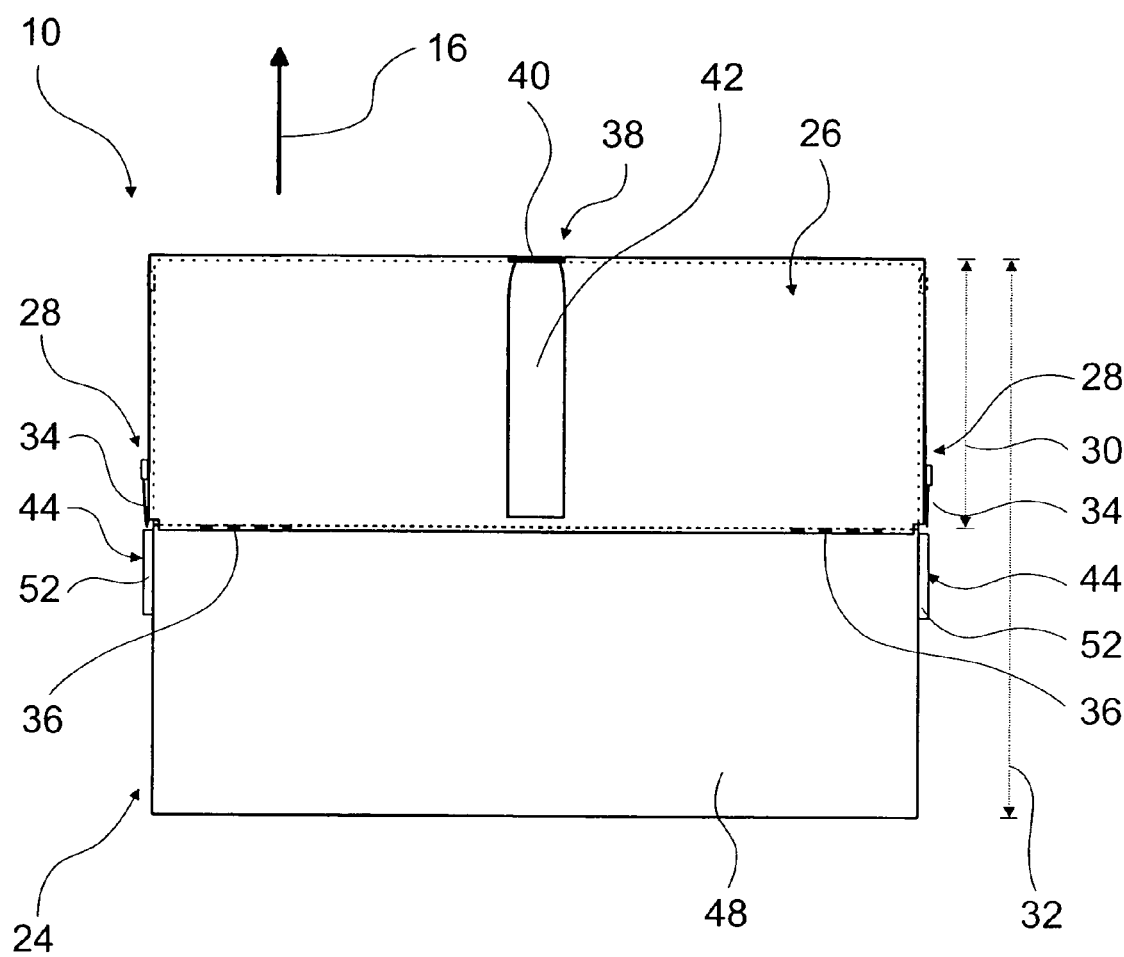
FIG. 4 shows a front view of the lifejacket container in the closed state.

The lid 26 closes an opening in the storage unit 24 through which a lifejacket can be removed. The lifejacket container 10 is arranged in such a manner that the lifejacket can be removed in a seating direction represented by the directional arrow 46. As shown in FIG. 4, a height 30 of the lid 26, as measured in a vertical direction represented by directional arrow 16, is approximately 50% of the overall height 32 of the lifejacket container 10 as measured in a vertical direction represented by directional arrow 16.

Figure 2:
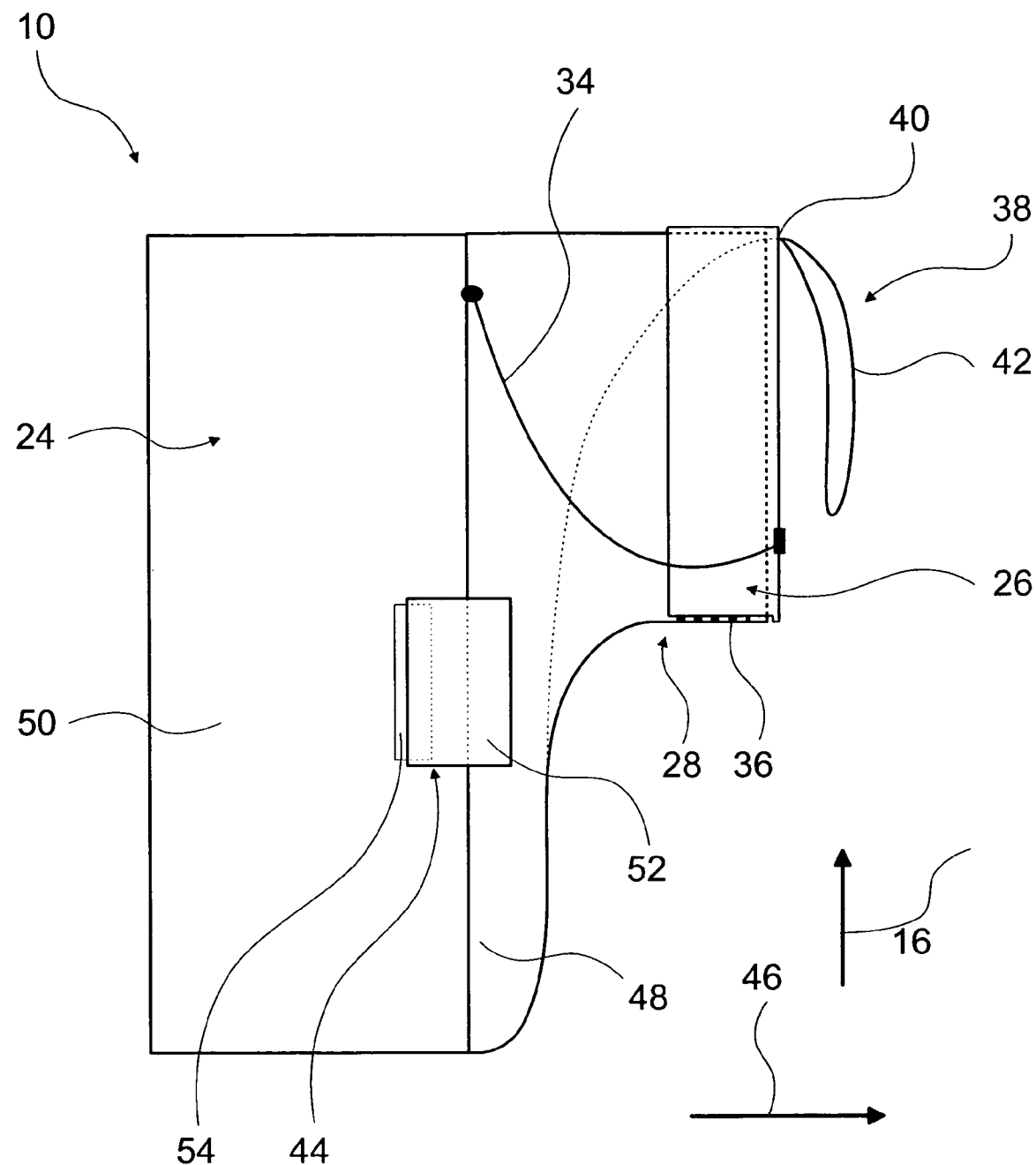
FIG. 2 shows a side view of the lifejacket container in the closed state.
Figure 3:
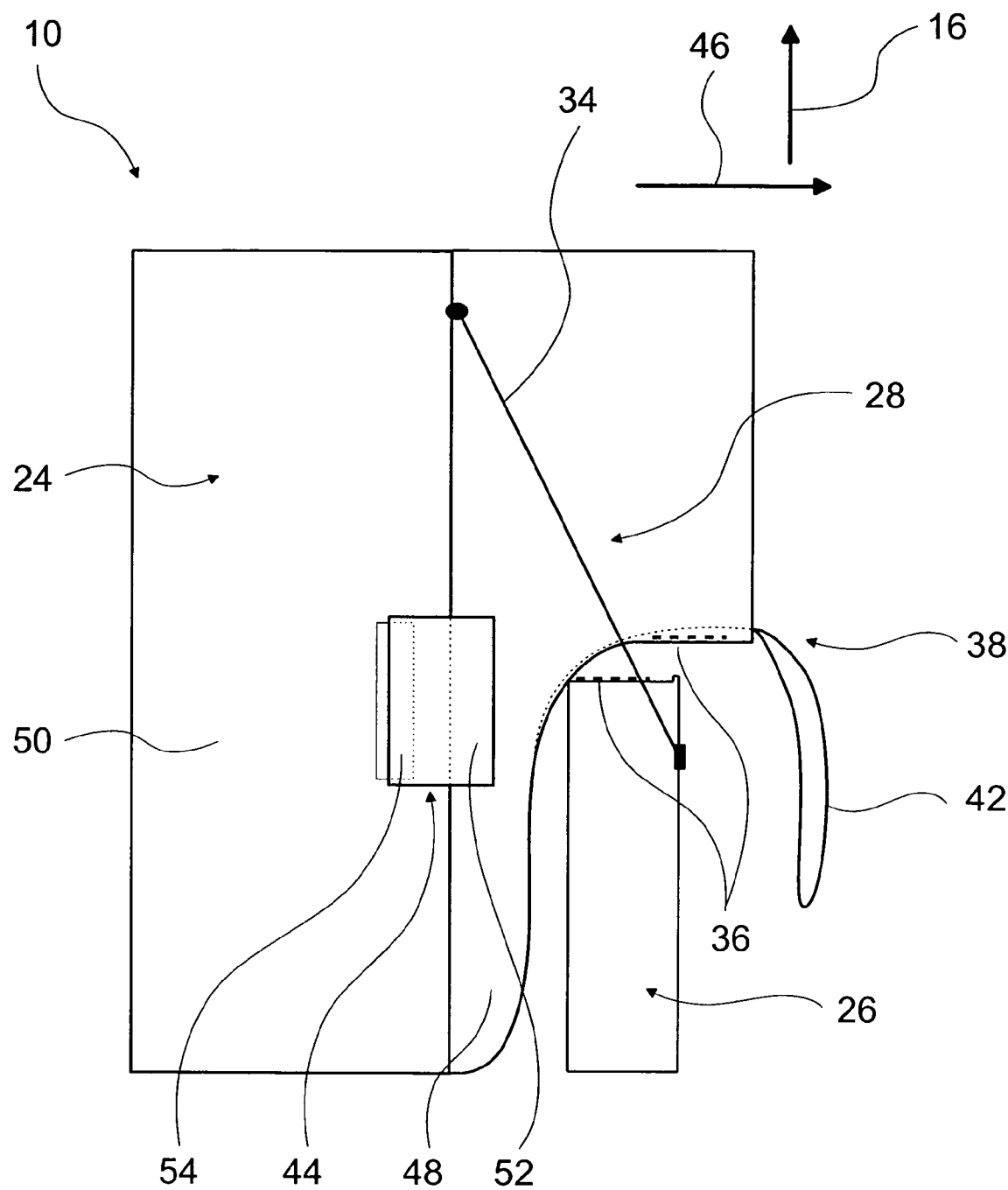
FIG. 3 shows a side view of the lifejacket container in an open state.

Referring to FIGS. 2, 3 and 4, the lid 26 is fixed in a closed state by an interlocking and frictional fastening means formed from a fleece and hook strip 36. The fleece strip 36 is attached to the lid 26 in such a manner that it is in contact with the hook strip 36, which in turn is attached to the storage unit 24. The fleece and hook strip 36 is attached to a side of the lid 26 that is the lower side in the closed state. In order to provide a contact surface, which is required for the fleece and hook strip 36, between the lid 26 and the storage unit 24, the lid 26 and an edge of the opening in the storage unit 24 are designed to be several centimeters thick. In particular, in the outer side regions, the lid 26 is designed as a fold that engages in the edges of the opening in the storage unit 24.

Furthermore, the lid 26 and the storage unit 24 are connected by two flexurally soft retaining means formed from cables 34. The cables 34 are attached at one end to an outside of the storage unit 24 and at another end to an outside of the lid 26 in the lower half of the lid 26.

Alternatively, instead of the flexurally soft retaining means formed by the cables 34, a hinge can be used, with it being possible for the arrangement of the hinge and of the fleece and hook strip 36 to differ from the above-described arrangement of the flexurally soft retaining means 34 and the fleece and hook strip 36. A defined folding movement of the lid 26 can likewise be achieved by means of a hinge.

As an opening unit 38, a cut-out 40, through which an opening means designed as a strip 42 is guided outwardly from the lifejacket container 10, is formed in an upper side region of the lid 26. The strip 42 is fastened at one end to the inside of the storage unit 24. Upon pulling on another end of the strip 42 designed as a loop, the lid 26 is raised from the storage unit 24 in the seating direction 46. After being raised, the lid 26 rotates and is offset downwardly by a force acting on the lid 26. The rotational movement is defined by fastening points of the cables 34. The cables 34 keep the lid 26 open in a position in which it rotates through 180° from the position in the closed state and is offset downwardly, with the cables 34 preventing the lid 26 from penetrating through to the seat mounting surface 20.

By means of the fastening of the lid 26 with the fleece and hook strip 36 in the closed state and by means of the position in the open state in which the cables 34 hold the lid 26, it is ensured that the lifejacket container 10 is arranged, in the open and closed states, exclusively on that side of the front boundary 22 that faces the seating apparatus.

In order to permit easy filling of the storage unit 24, the storage unit 24 is a two-part design. In order to permit easy division of the storage unit 24 without a tool, a connecting unit, which connects a front part 48 and a rear part 50 of the storage unit 24, is formed from two latching units 44. The latching units 44 each comprise a resilient latching means 52 on the front part 48 of the storage unit 24 and a latching cut-out 54 on the rear part 50 of the storage unit 24, with the latching means 52 and the latching cut-out 54 each being formed integrally with the respective parts 48, 50 of the storage unit 24.

The invention is described herein in detail with particular reference to presently preferred exemplary embodiments. However, it will be understood that variations and modifications can be effected within the scope and spirit of the invention.

The invention claimed is:

1. An airplane seating apparatus, comprising:
   a seat including a seat surface;
   a backrest;
   a seat front end, which is located at an opposite end of the seat from the backrest;

at least three fastening points, which support the seating apparatus on a floor and together define a seat mounting surface;

a front boundary plane, wherein the front boundary plane is perpendicular to the seat mounting surface and adjacent an edge of the seat front end, and wherein the backrest is located on a rear side of the front boundary plane; and a lifejacket container arranged on the rear side of the front boundary plane in both an open state and in a closed state, wherein the life jacket container comprises:

a storage unit having a lid-receiving recess, an opening unit including an opening through which a lifejacket can be removed from the storage unit, a cut-out, and a strip having one end fastened to an inside of the storage unit and another end extending out of the storage unit to an outside through the cut-out, a lid including a lid fastening unit for closing the opening of the opening unit; and when the other end of the strip is pulled, the lid is removed from the storage unit exposing the opening, and then the lid arranged in the lid-receiving recess in the open state of the lifejacket container.

2. The airplane seating apparatus as claimed in claim 1, wherein the lifejacket container is arranged below the seat surface of the seating apparatus.

3. The airplane seating apparatus as claimed in claim 1, wherein the lid fastening unit comprises at least one frictional fastening unit.

4. The airplane seating apparatus as claimed in claim 3, wherein the frictional fastening unit comprises at least one flexurally soft retaining means.

5. The airplane seating apparatus as claimed in claim 1, wherein the storage unit is of multi-part design and comprises at least two parts.

6. The airplane seating apparatus as claimed in claim 5, wherein the storage unit comprises at least one latching unit, which connects the parts of the storage unit to one another.

* * * * *